United States Patent

Holmes

[15] 3,682,482

[45] Aug. 8, 1972

[54] MAGNETIC RECORDING APPARATUS HAVING AN IMPACT RESISTANT HEAD MOUNTING FEATURE

[72] Inventor: William A. Holmes, Marblehead, Mass.

[73] Assignee: Polaroid Corporation, Cambridge, Mass.

[22] Filed: Feb. 2, 1970

[21] Appl. No.: 7,810

[52] U.S. Cl. ................274/4 H, 274/9 C, 274/13 A, 274/15 R

[51] Int. Cl. ..........................G11b 5/58, G11b 25/04

[58] Field of Search....274/4 H, 4 J, 9 C, 13 A, 15 A, 274/15 B, 15 R, 14, 42 R, 42 P, 23 R, 23 A; 179/100.2 A, 100.2 CA, 100.2 T

[56] References Cited

UNITED STATES PATENTS

| | | | |
|---|---|---|---|
| 2,554,347 | 5/1951 | Rouse | 274/13 A |
| 2,690,340 | 9/1954 | Harrison | 274/13 A |
| 3,224,782 | 12/1965 | Isemura | 274/9 C |
| 3,322,427 | 5/1967 | Fujimoto | 274/4 J |
| 3,507,502 | 4/1970 | Rabe | 274/15 R |

FOREIGN PATENTS OR APPLICATIONS

| | | | |
|---|---|---|---|
| 1,124,255 | 2/1962 | Germany | 274/4 H |

*Primary Examiner*—Leonard Forman
*Assistant Examiner*—Dennis A. Dearing
*Attorney*—Brown and Mikulka, William D. Roberson and Gerald L. Smith

[57] ABSTRACT

Magnetic sound recording and reproducing apparatus adopted for use with a recording member having a magnetic surface concentrically disposed about a given axis with respect to a spirally grooved tract. The apparatus is characterized in the use of a head-follower assembly having a follower pin engageable with the spiral tract to establish a locus for a magnetic recording trace. The assembly is resiliently mounted in a manner permitting the head-follower assembly to pivot about the point of contact of the follower pin with the tract.

10 Claims, 9 Drawing Figures

INVENTOR.
WILLIAM A. HOLMES
BY Brown and Mikulka
and
Gerald L. Smith
ATTORNEYS

INVENTOR.
WILLIAM A. HOLMES
BY Brown and Mikulka
and
Gerald L. Smith
ATTORNEYS

INVENTOR.
WILLIAM A. HOLMES
BY *Brown and Mikulka*
*and*
*Gerald L. Smith*
ATTORNEYS

PATENTED AUG 8 1972

3,682,482

INVENTOR.
WILLIAM A. HOLMES

BY Brown and Mikulka
and
Gerald L. Smith
ATTORNEYS

MAGNETIC RECORDING APPARATUS HAVING AN IMPACT RESISTANT HEAD MOUNTING FEATURE

This invention relates to audio-visual recording devices and, more particularly, to a magnetic sound recording and reproducing devices of a hand-held variety which record audio information upon a non-image carrying surface of a photograph.

BACKGROUND

Magnetic recording and playback systems function through the translation or mutual movement of a magnetic surface, for instance in tape form, with respect to the head of a magnetic transducer assembly. Information is recorded or "read out" by selectively inductively affecting the material of the magnetic surface or appropriate portions of the head from the surface. It follows, that a proper contacting orientation of the head and magnetic surface is important to the operation of the system.

In magnetic recorder-playback applications wherein a stationary, somewhat rigid magnetic surface is substituted for flexible tapes and the magnetic head is moved across the surface in a predetermined pattern such as a spiral trace, contact between the surface and the head becomes more difficult to maintain. However, a variety of useful applications for recording units using stationary magnetic recording systems have been proposed. Of particular interest, the laminar combination of such a recording surface with casual still photographs, for instance those popular in conventional amateur photography, will permit a desirable recording of both audio as well as visual information from a subject or a scene. Such recording systems find particular utility when combined with cameras and film products which permit the processing of a photograph immediately following or coincidently with the exposure of a film frame.

To find market acceptance, however, such audio-visual systems must be fabricable in light weight and compact form and at reasonable cost. Further, the record-playback units should provide for reliable operation under hand-held conditions. For instance, under such conditions, the entire unit may be subject to movement or impact which may not only momentarily disrupt a necessary contact between the magnetic surface and the head, but also cause the displacement of the head from its pre-established recording trace. The latter condition will usually lead to an aborted recording.

In one proposed audio-visual apparatus, the above mentioned trace or pattern followed by the transducer head is established by a spiral groove centered within the plastic base of a recording member. A follower cam or pin interlinked with the head is urged into the grooves of the spiral track to cause the head to move in or trace a corresponding spiral pattern. A biasing arrangement continuously urges the head and follower pin assembly into a reset position. Without appropriate correction, movement of or impact with the unit may cause an inadvertent or spurious disengagement of the follower pin from the track allowing the head to move toward its reset position thereby permitting a possible destruction of the earlier established magnetic trace.

SUMMARY

The present invention is addressed to a magnetic recording-playback apparatus operable in conjunction with a stationary and flat recording surface and which is substantially immune to operational interruption occasioned by hand-held motion or spurious impact. Such devices are especially useful with magnetic recording-playback systems in which a magnetic recording trace defined by the contact of a moving head with the surface is produced by the engagement of a follower member with a corresponding camming track formed upon or within the surface of a recording member.

Recording and playback integrity is substantially assured with the inventive apparatus through the unique mounting of the magnetic head of the system in correspondence with a follower member engaged within a spiral camming track disposed within a recording member. The mounting arrangement of the invention is characterized in permitting a coupled head and follower member unit to pivot about the contact of the follower member with the spirally grooved track of the recording member. A resilient bias such as provided by a spring arrangement urges the head into contact with the magnetic surface of the recording member and the follower member into contact with a centrally disposed spiral track. Inasmuch as the mass of the magnetic head unit is significantly greater than the mass of the follower member, spurious movement or impact of the entire recording unit will tend to urge the follower member into contact with the spiral track with greater force. As a result, the instantaneous orientation of the magnetic head will respect to the spiral trace which it is defining will be disrupted only momentarily and only along the length of the signal path which it is tracing. The head will not be thrown from the spiral trace preordained by the initial or starting contact of the follower member with the introductory portion of the spiral track.

Short interruptions of the contact of the head with the magnetic surface can be accepted and cause no significant loss of recording data as long as they are present along the linear extend of the trace defined by the engagement of the follower member with its corresponding camming groove. Loss of trace, however, occasioned by a disconnection of the follower member from its groove will usually result in a completely aborted record.

The mounting arrangement of the invention provides the emphasized contact of the follower member with its corresponding cam groove with a mechanical arrangement which is readily fabricable at low cost while maintaining a high degree of operational reliability.

A further feature and object of the invention is to provide a magnetic sound recording and reproducing apparatus for use with a recording member having a stationary magnetic surface concentrically disposed with respect to a spirally grooved track. A transducer arrangement is incorporated within the assembly and includes a magnetic head for reading and recording intelligence upon the magnetic surface when it is engaged therewith. The head assembly is coupled with and radially oriented with respect to a follower pin spaced a predetermined distance therefrom. This follower pin is engageable within the aforesaid spirally grooved track.

The assembly of follower pin and magnetic head is mounted pivotally within the apparatus such that the mounting arrangement is permitted to pivot about the contact of the follower pin with the spirally grooved track. Because of the significant difference in the mass of the magnetic head in comparison to the mass of the pin, any movement of the entire apparatus tends to pivot the mounting arrangement about the aforesaid contact of the follower pin with the grooved track. As a consequence, a tolerable instantaneous interruption of contact of the magnetic head with its corresponding surface may be occasioned, however, the spiral trace of the head remains continuous.

DETAILED DESCRIPTION

Figure 1:
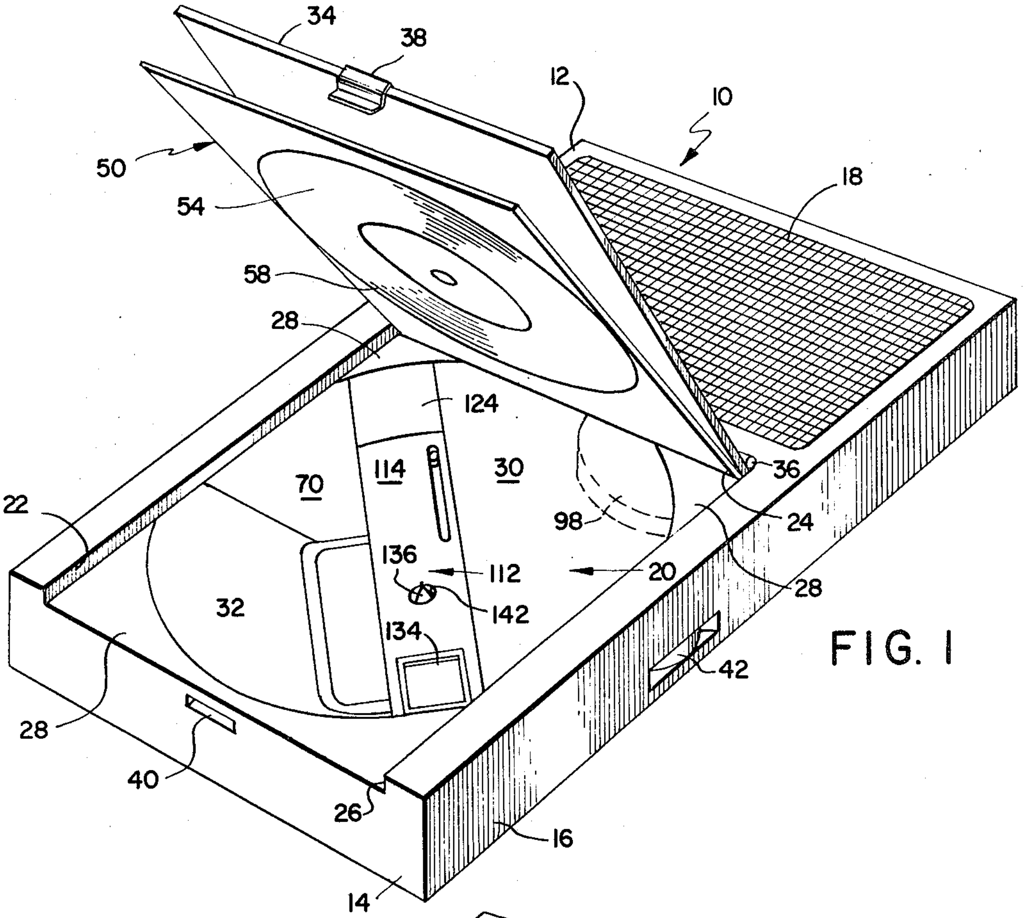
FIG. 1 is a pictorial representation of a recording-playback unit incorporating features of the present invention.

Referring to FIG. 1, a compact, portable recording-playback unit is illustrated generally at 10. Unit 10 is dimensioned so as to be conveniently carried in the pocket of a garment or the like. Accordingly, it is fashioned as a somewhat elongate parallelepiped having a limited thickness. The recording-playback unit 10 is formed having a front face 12 and side walls 14 and 16, all of which may be molded integrally to form a unitary structure. One portion of front face 12 is removed to carry a lattice-type covering 18 beneath which are positioned acoustically loaded transducer elements such as a speaker and microphone. Next to the lattice-type covering 18, front face 12 is configured having a receiving chamber depicted generally at 20. This receiving chamber 20 is fashioned having side walls 22, 24 and 26 arranged in mutually perpendicular orientation to define a rectangular opening. Side walls 22, 24 and 26 are joined integrally with a bottom planar support platform 28. Bottom platform 28 is configured to define an annular opening 30, the edge of which is shown at 32. Opening 30 serves to expose one side of the receiving chamber to internally disposed mechanisms of the recording-playback apparatus. Receiving chamber 20 additionally includes a rigid, transparent top cover 34 hinged at 36 upon front face 12. Transparent top cover 34 is rotatable about hinge 36 into a position covering receiving chamber 20. Top 34 is retained in a closed orientation by the engagement of a spring loaded latching member 38 with a corresponding latching notch 40.

Figure 2:
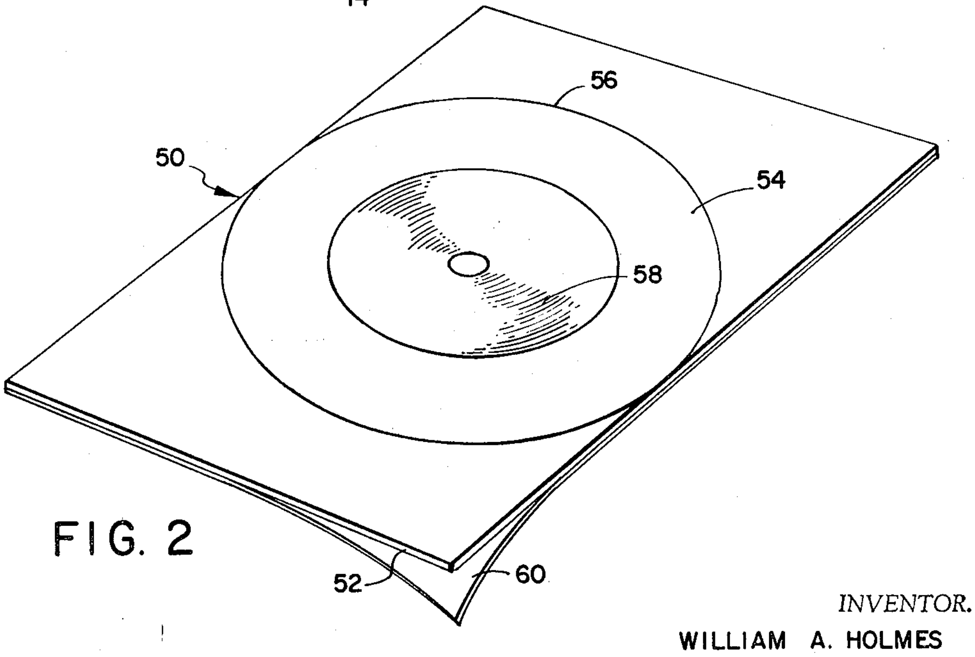
FIG. 2 is a pictorial representation of a recording member used with the apparatus of FIG. 1, portions of which are deformed to reveal a laminar form of structure.

Referring additionally to FIG. 2, a recording member configured for use with the recording-playback unit 10 is illustrated generally at 50. Member 50 is formed having a laminar configuration including a plastic base portion 52 over which is formed a thin magnetic surface as at 54. In the embodiment illustrated, magnetic surface 54 is configured as a ring having an outer periphery 56. The extent of the area of surface 54 will, in most embodiments, be determined by the technique of manufacture. In the embodiment illustrated, surface 54 is deposited upon a supporting sheet of paper or the like which, in turn, is adhesively affixed to the planar surface of base member 52. Centrally disposed within plastic portion 52 is an integrally formed spirally or cyclically grooved track 58. Track 58 may be formed simultaneously with the fabrication of base member 12, or may be fashioned by simple stamping procedures or the like. The spiral portion of track 58 is formed concentrically with the ring shaped periphery of magnetic surface 54. The opposite face of base 52 may be used to support a photograph as at 60. For instance, the rear supporting surface of photograph 60 may be mounted upon base portion 12 with a contact adhesive.

From the foregoing, it may be observed that the recording members as at 50 are fabricable using high volume, low cost techniques. The members 50 are preferably formed in a size corresponding to a predetermined size of photographic print.

Record member 50 and receiving chamber 20 are mutually rectangularly configured such that member 50 is insertable within the receiving chamber 20 and laterally supportable therein by side walls 22, 24 and 26. As shown in FIG. 1, the record member 50 is inserted within chamber 20 in a manner wherein magnetic surface 54 and spiral track 58 are positioned over opening 30. Additionally, edge 32 of opening 30 will closely correspond with the outer periphery 56 of magnetic surface 54 when unit 50 is in position. Support about the periphery 54 for the unit 50 is provided by bottom platform 28 while oppositely directed support is provided by rigid transparent top 34.

When member 50 is inserted as described and transparent, rigid top 34 is closed and latched by interconnection of 38 with notch 40, a manually actuated switch as at 42 is thrown to commence a recording or playback procedure. During recording operation, the unit 10 is hand-held near the mouth of the operator or oriented to receive audible information from a select source. Following a recording procedure, the top cover 34 is opened about hinge 36 and recording member 50 is removed for storage. The provision of a transparent material for top cover 34 permits an operator to observe the data upon photograph 60 as audio information is recorded.

When positioned within the receiving chamber 20 in the operative orientation described above, recording member 50 is situated for operative cooperation with magnetic recording instrumentalities mounted within the interior of unit 10. These instrumentalities include transducer units, detector and amplification components, motorized drive systems, microphones, and one or more speaker units. Conventional circuitry, speaker units, microphones and power supplies are used within the apparatus of the invention, and, accordingly, are not illustrated herein.

When positioned for operation within unit 24, the spirally grooved track 58 and magnetic surface 54 of recording member 50 will be automatically positioned so as to physically communicate with a magnetic head and related tracking assembly disposed within opening 30. Referred to FIGS. 3, 4 and 5, the structure of these elements of unit 10 are portrayed in detail. The elements serving to record and re-out information to and from magnetic surface 54 function to move a magnetic head in continuous contact with surface 54 along a spiral trace established by the association of the magnetic head with the earlier described spiral track 58. Rotational motion is imparted to the magnetic head by a turntable shown generally at 70. Turntable 70 is formed having a right cylindrical shape including a planar top surface 72 and a peripheral drive surface 74. Fashioned from a suitable plastic material, turntable 70 is generally hollow and is supported internally by supporting ribs 76 and carriage support ribs 78 and 80 along with that portion of the turntable defining cylindrical peripheral drive surface 74. Turntable 70 is fixedly mounted upon a cylindrical shaft 82 extending from its undercarriage along its centrally situated axis of rotation. Shaft 82 is formed from a metallic, electrically conductive material and is rotatably-slidably mounted within a centrally bored boss 84 fixed, in turn, to the bottom panel 44 of the unit 10. Boss 84 is positioned within unit 10 at a location substantially co-axial with the central axis of the spiral defined by grooves 58. Slidable support between boss 84 and shaft 82 is provided by an electrically insulative intermediately journaled bearing 86. As is described in more detail later herein, shaft 82 supports turntable 70 at an elevation within unit 10 wherein top surface 72 of the turntable is positioned just below bottom support platform 28 of receiving chamber 20.

Figure 9:
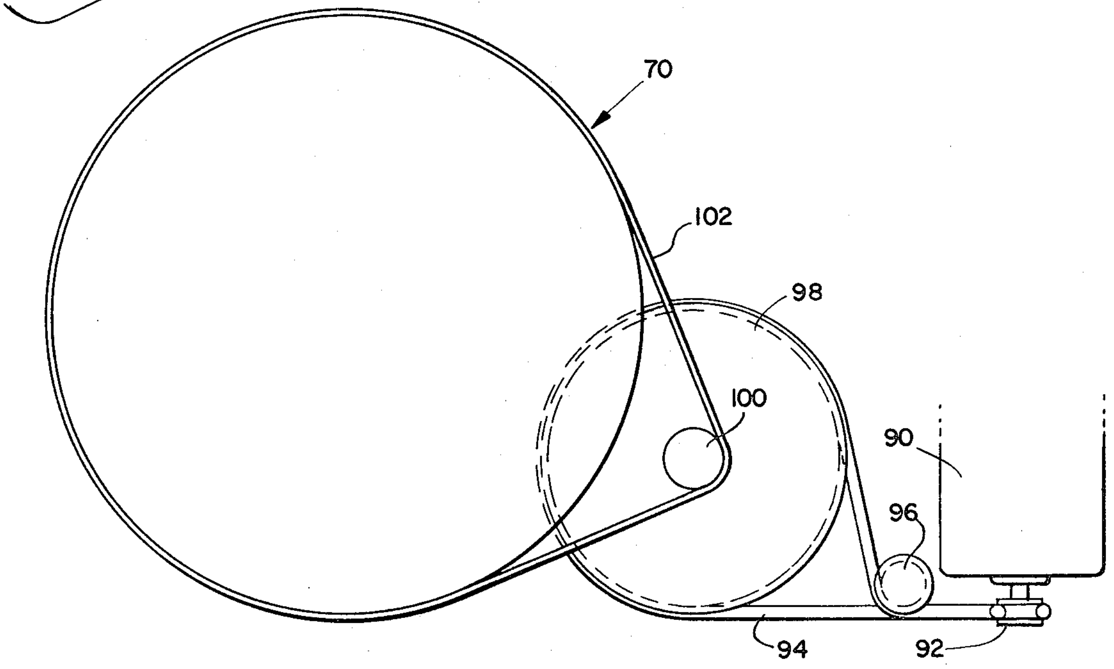
FIG. 9 is a plan view of a motorized drive system used with the recording-playback unit illustrated in FIG. 1.

Referring additionally to FIG. 9, a drive arrangement causing rotation of turntable 70 is portrayed. Power for causing this rotation is derived from an electrical motor 90 positioned within the unit 10. A drive pulley 92 is journaled over the drive shaft of motor 90 and is engaged with an endless belt 94. Belt 94 is passed over an idler pulley 96 to provide a 90 degree shift in its plane of motion. From idler pulley 96, endless belt 94 extends about the root periphery of a flywheel 98.

Inasmuch as turntable 70 is formed of a light plastic material, momentum to assure smooth or uniform rotational speed of the turntable 70 is derived by forming the flywheel 98 of metal or similar higher mass material. For instance, flywheel 98 may be fabricated from copper or bronze. Additionally, advantage has been found to accrue from the use of a flywheel arrangement by virtue of the more compact packaging available with its incorporation in the apparatus.

Fixed co-axially to flywheel 98 is a second drive pulley 100 having a diameter selected in relation to that of turntable 70 so as to achieve appropriate turntable rotational speed. Rotational power is transmitted from second drive pulley 100 to turntable 70 by an endless belt 102 passing over pulley 100 and the peripheral drive surface 74 of turntable 70. To avoid flutter effects occasioned by speed variations in turntable 70, it is desirable that endless belt 102 be fabricated of a flexible, but inelastic, material.

Figure 3:
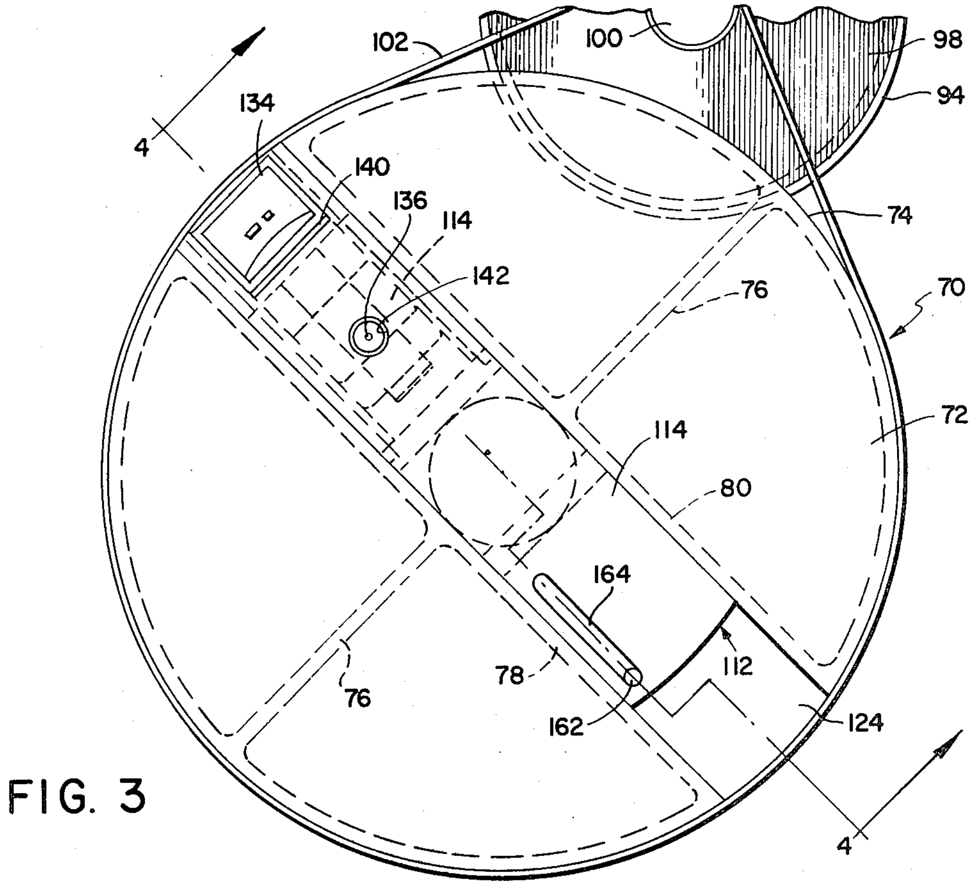
FIG. 3 is a front view of a turntable and carriage assembly used with the recording-playback unit illustrated in connection with FIG. 1.
Figure 4:
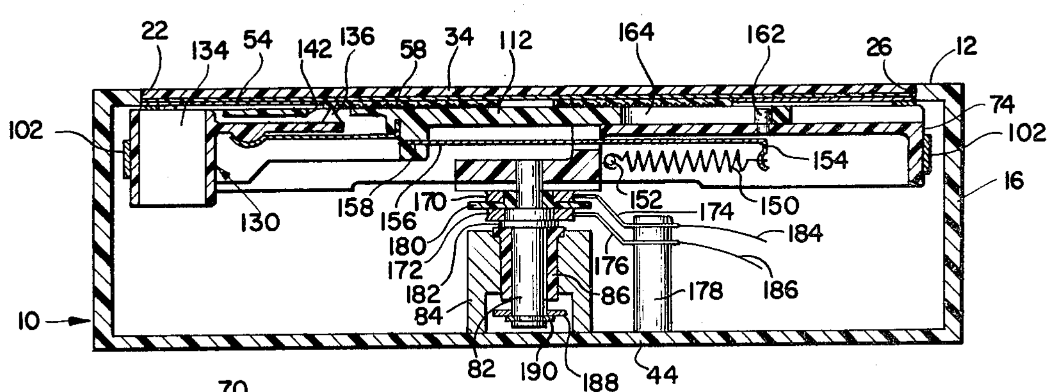
FIG. 4 is a sectional view of the recording-playback unit of FIG. 1, taken through the plane 4—4 in FIG. 3.
Figure 6:
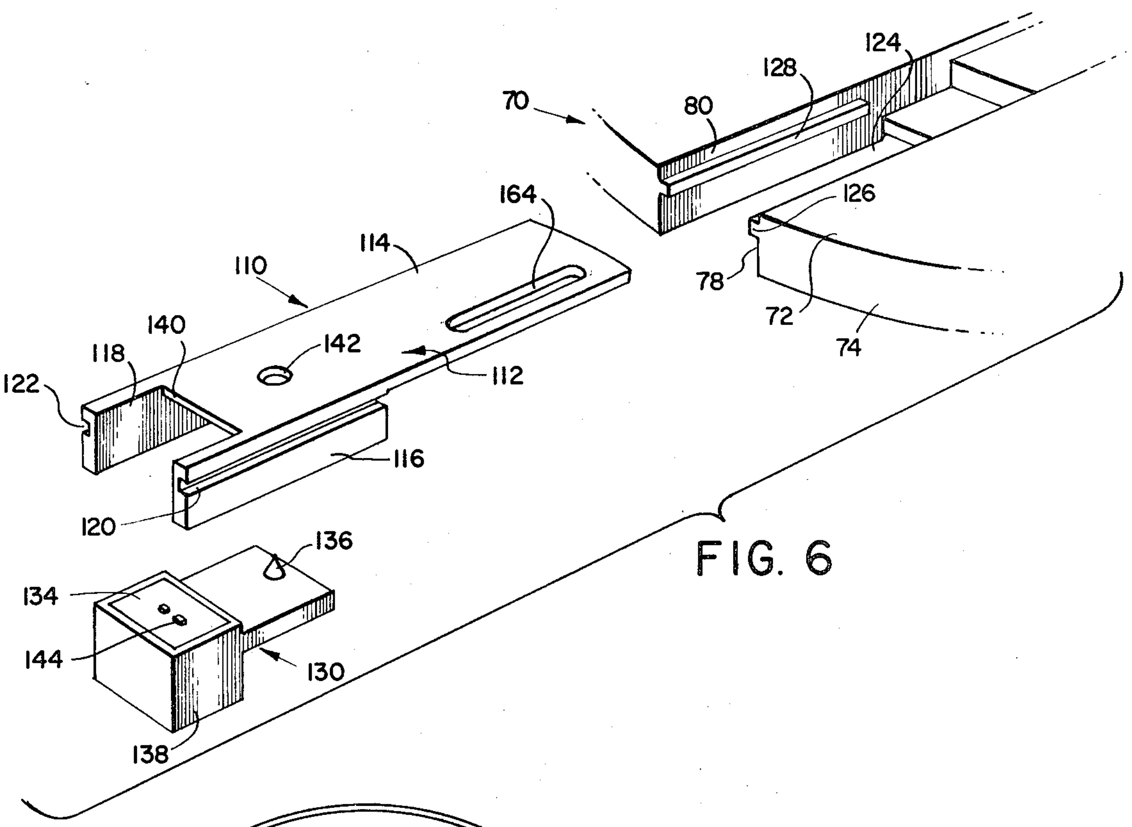
FIG. 6 is an exploded pictorial representation of the carriage and follower-magnetic head mounting of the invention.

Referring to FIGS. 3, 4 and 6, turntable 70 is configured to carry a radially disposed carriage assembly indicated generally at 110. Carriage assembly 110 includes a movable carriage member 112 structurally formed as a channel having an upward facing web portion 114 molded integrally with side flange portions 116 and 118 depending perpendicularly therefrom. The latter flange portions 116 and 118 are formed having longitudinally disposed keyways of cross section shown respectively at 120 and 122. Carriage member 112 is dimensioned so as to be slidable radially within a channel 124 of rectangular cross section having a longitudinal axis extending radially from the center of turntable 70. Slidable support of the carriage member 112 is provided by the slide coupling of keyways 120 and 122 respectively with keys or ribs 126 and 128 formed, in turn, within respective supporting ribs 78 and 80 of turntable 70.

When inserted within channel 124, carriage member 112 is permitted sliding radial movement from the axis of rotation of the turntable. Radial guidance is provided for the member 112 by the portion of top rib 114 which extends beyond the flange portions 116 and 118. As seen in FIG. 3, this portion of the web 114 extends beyond the center of rotation of the turntable and is in slidable contact with the facing surfaces of carriage support ribs 78 and 80.

Carriage member 112 is additionally configured to support a head-follower assembly 130 at a position located outwardly of the center of rotation of turntable 70. Formed of a dimensionally stable and readily molded plastic, the assembly 130 serves the initial function of providing a mounting support for a magnetic support transducer head 134 in predetermined spaced relationship from a follower or tracker pin 136. When mounted within carriage member 112, the magnetic head supporting portion 138 of head-follower assembly 130 nests within a correspondingly dimensioned notch 140 formed within a carriage member 112. Additionally, in this mounted configuration, the follower pin 136 will project through an aperture 142 formed in upward portion 114 of carriage member 112.

Figure 5:
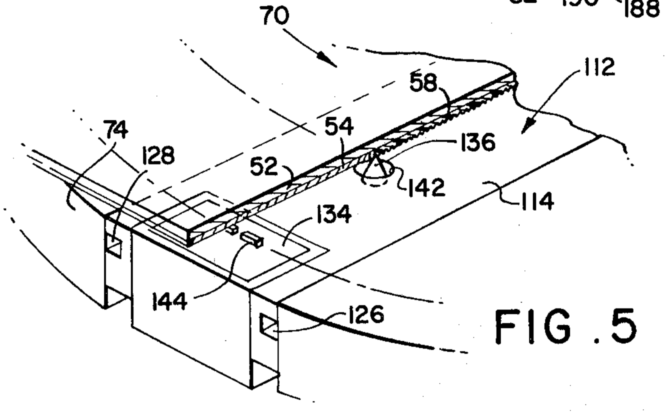
FIG. 5 is a fragmentary perspective view of portions of the recording member of FIG. 2 and recording-playback unit of FIG. 1 as they are joined in an operative association.

When so mounted within carriage member 112, the pole piece tips 144 of magnetic head 134 will be spaced a very accurately established distance from follower-tracker pin 136. This spacing arrangement permits an ideal, universally available registration between pole piece tips 144 and any spiral magnetic trace previously recorded upon surface 54. This arrangement, as is illustrated pictorially in FIG. 5, is the subject of a co-pending application for U. S. Patent, Ser. No. (Our Case 2040), by Edison R. Brandt and Christopher R. Rice, titled "Magnetic Recording and Playback System For Use With Photographic Records," filed of even date herewith and assigned to the assignee of the instant application.

Looking to FIG. 4, an arrangement for biasing the carriage assembly 110 outwardly from the center of rotation of turntable 70 is illustrated. Outwardly directed bias is provided by a helical spring 150, a stationary end of which is coupled to a pin 152 fixed to a portion of the undercarriage of turntable 70. The opposite end of spring 150 is attached to a hooked end portion 154 of a rod 156. Rod 156 extends to appropriate openings within the undercarriage of turntable 70 and is connected at 158 to the underside of carriage member 112. Radial movement of carriage assembly 110 is restricted by a pin 162 fixed within channel 124 to turntable 70. Pin 162 is positioned to extend through an elongate slot 164 formed within the upward facing web portion 114 of carriage member 112. Terminal limitation for the radial movement of carriage member 112 is established by the abutment of pin 162 with the lengthwise end portions of slot 164.

Electrical interconnection between the magnetic transducer head 134 and electronic instrumentalities within the unit 10 is provided by a slip ring arrangement which functions in conjunction with the cylindrical shaft 82 of turntable 70. Two slip rings 170 and 172 are arranged on the shaft 82 in an orientation permitting their electrically conducting cooperation with corresponding spring wire brushes illustrated respectively at 174 and 176. Brushes 174 and 176 are mounted upon an electrically insulative post 178 extending from the base of unit 10. An electrical lead (not shown) provides electrical conduction from the head 134 to the electrically conductive shaft 82, thence into slip ring 172. A second lead (not shown) from head 134 is coupled to slip ring 170. Slip ring 170 is supported upon shaft 64 as well as insulated therefrom by an electrically insulative insert 180. Slip ring 172 is positioned over an electrically conductive thrust bearing 182 which is journaled over shaft 82 and bears against boss 84. Electrical leads 184 and 186 are coupled respectively to brushes 174 and 176 for providing electrical communication from head 134 into instrumentalities within the recording-playback unit 10. Completing the assembly, shaft 82 of turntable 70 is secured in rotatable fashion to bearing 86 by a frictionally engaged lock washer 188 in combination with a washer 190.

From the foregoing description, it may be concluded that the presently described recording-playback apparatus is ideally fabricable in small, compact form. The resultant portability of the unit 10 lends to its utilization under hand-held conditions. During such periods of use, the entire unit may be subject to movement or impact which may disrupt a necessary contact between the locus of the magnetic trace upon surface 54 and the pole pieces 144 of electromagnetic 134. Disruption along the locus or trace will generally be for only insignificant periods of time and, in practical operation, may be dismissed. Should the follower pin 136 be dislodged from its engagement with an appropriate groove within spiral track 58, however, the outer bias exerted by spring 150 upon carriage member 112 will cause a total disruption of continuity in the spiral locus being defined by contact between pole pieces 144 and recording surface 54. In most instances, such dislodgement will require that the recording be started anew, or if the unit 10 is in a playback mode, the head 134 will have to be returned to its outermost position to restart a playback operation.

With design simplicity, the present invention provides a mounting arrangement for head-follower assembly 130 which considerably improves the engagement relationship between follower pin 136 and an appropriate groove within spiral track 58.

Figures 7, 8:
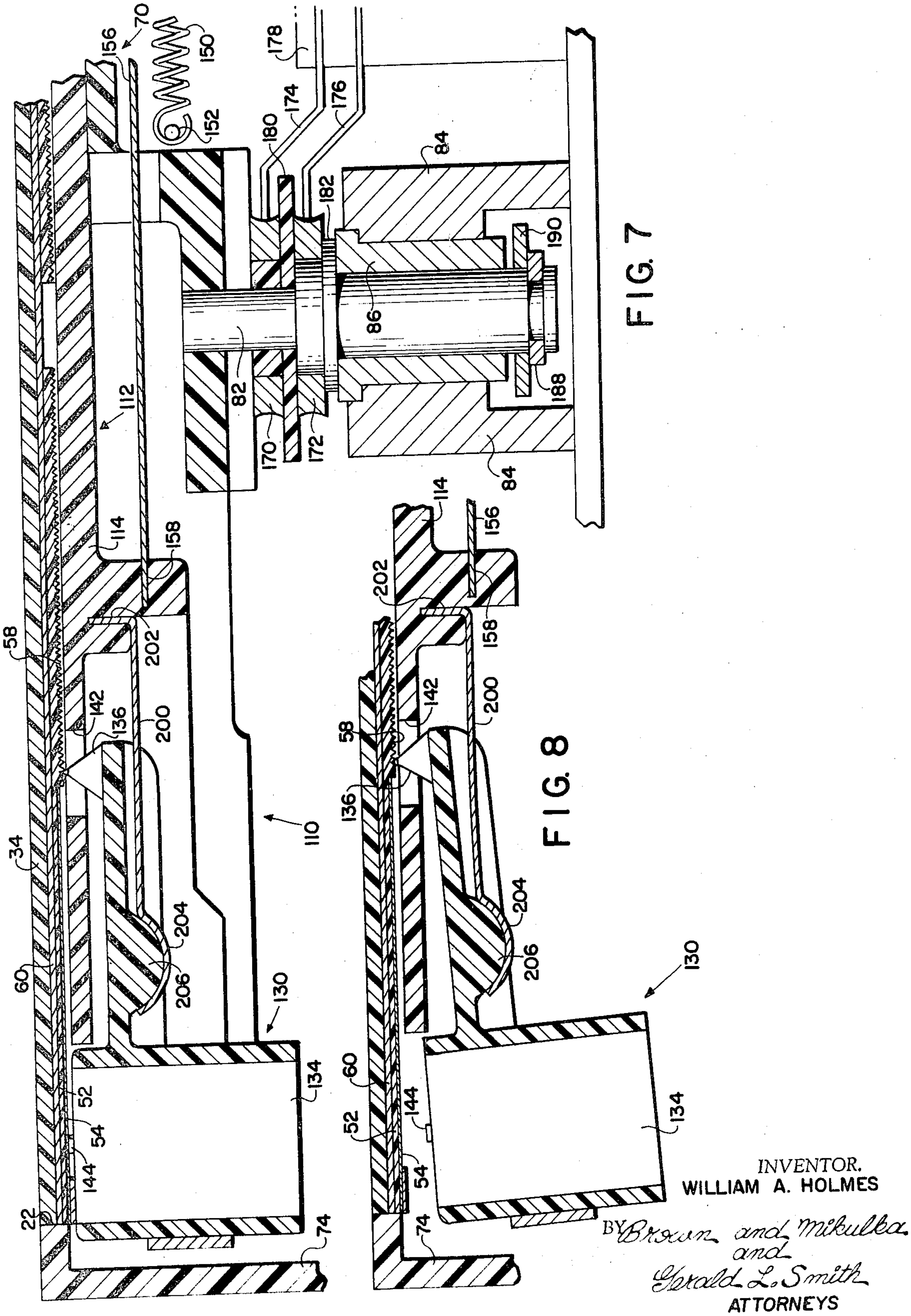
FIG. 7 is an enlarged sectional view of the recording-playback apparatus taken through the plane 4—4 in FIG. 3.
FIG. 8 is a fragmentary view taken from FIG. 7 showing an operational aspect of the magnetic head mounting assembly of the invention.

Looking to FIG. 7, head-follower assembly 130 is shown supported in recording-playback orientation by a leaf spring 200. Spring 200 is fixed to the underside of carriage member 112 at 202 and extends therefrom in cantilever fashion to an opposite tip portion 204 formed as a section of a right cylinder. Portion 204 is configured to pivotally support a seating element 206 formed integrally within head-follower assembly 130. As may be evidenced from the constructional arrangement, spring 200 serves to urge the pole pieces 144 of head 134 into engagement with surface 54 and, simultaneously, urge the tip of follower pin 136 into engagement with an appropriate groove of spiral track 58. The coupling between spring 200 at 204 and head-follower assembly 130 at 206 is intermediate the magnetic head 134 and follower pin 136. This intermediate positioning may be varied in accordance with the relative mass of magnetic head 134 with respect to the mass of that portion of the head-follower assembly on the opposite side of seating element 206.

With the arrangement shown and in consideration of basic Newtonian Laws of motion, the relatively higher mass of magnetic head assembly 134 will tend to cause its movement outwardly from contact with surface 54 in response to movement of unit 10 well before any such relative displacement occurs between pin 136 and track 58. More particularly, as shown in FIG. 8, such relative displacement of head 134 from surface 54 will tend to cause the head-follower assembly 130 to pivot about the engagement of follower pin 136 with a spiral groove at 58 and emphasize the latter engagement. Such a resultant orientation is illustrated in the latter figure. Upon the subsidence of any hand-held motion, the head-follower assembly 130 will return to its proper orientation shown in FIG. 7. Attention is directed to the advantageously simple construction required to achieve this desirable immunity to motion which is encountered during the utilization of hand-held recording units. While a very short interval of separation between pole pieces 144 and magnetic surface 54 may be encountered as a result of spurious impact, the original recording trace will not be radially interrupted. Only nominal and dismissable loss of audio information will be realized as opposed to a loss of the entire recording trace.

Further advantage accrues from the separate, spring biased mounting of head-follower assembly 130. Should the magnetic surface 54 vary from a desired flatness or be displaced from orientation upon supporting platform 28, the upward travel permitted by the biased mounting of spring 200 will assure proper contact between assembly 130 and unit 50.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Magnetic sound recording and reproducing apparatus for use with a recording member having a magnetic surface concentrically disposed about a given axis with respect to a cyclically grooved track comprising:

a head-follower assembly including:

transducer means including a magnetic head assembly for reading and recording intelligence on said magnetic surface when engaged therewith, follower means spaced a predetermined distance from said magnetic head assembly for movable engagement with said grooved track, the moment of said follower means being smaller than the moment of said magnetic head assembly, and mounting means for retaining said magnetic head assembly and follower means at said predetermined mutually spaced apart distance;

carriage means rotatable about said given axis and movable radially with respect thereto for supporting said head-follower assembly in an orientation permitting said follower means to engage said track and said magnetic head assembly to inductively couple with said recording surface so as to cause, when rotated about said given axis, said magnetic head assembly to trace a recording upon said magnetic surface having a locus corresponding to said cyclical track; and resilient means coupled with said carriage means for resiliently urging said magnetic head assembly and said follower means respectively into engagement with said magnetic surface and said grooved track, said resilient means being coupled intermediate said follower means and said magnetic head assembly and the said resilience thereof being so selected to promote the pivoting of said magnetic head assembly about the position of said engagement of said follower means with said track when said engagement between said magnetic head assembly and said magnetic surface is inadvertently and momentarily broken.

2. The magnetic sound recording and reproducing apparatus of claim 1 wherein said follower means is selected having an inertial mass substantially lower than said magnetic head assembly.

3. The magnetic sound recording and reproducing apparatus of claim 1 in which:

said follower means is selected having an inertial mass substantially lower than said magnetic head assembly; and said resilient means is coupled intermediate said carriage means and said head-follower assembly at a selected position intermediate said magnetic head assembly and said follower means.

4. The magnetic sound recording and reproducing apparatus of claim 3 wherein said follower means is present as a follower pin movably engageable with said grooved track.

5. The magnetic sound recording and reproducing apparatus of claim 4 wherein said magnetic head assembly and said follower pin are radially aligned upon said carriage means with respect to said given axis.

6. The magnetic sound recording and reproducing apparatus of claim 2 wherein said resilient means is formed as a spring having a stationary side fixed to said carriage means and a movable side pivotally coupled with said head-follower assembly.

7. The magnetic sound recording and reproducing apparatus of claim 6 wherein said spring movable side is coupled with said head-follower assembly at a position selected intermediate said magnetic head assembly and said follower means whereby said head-follower assembly will tend to pivot about said follower means in the presence of an abrupt change of inertia.

8. Magnetic sound recording and reproducing apparatus for use with a recording member incorporating a cyclically grooved track having a given axis and a magnetic recording surface disposed outwardly from the outermost periphery of said track comprising:

a mounting member;

a magnetic head assembly fixed to said mounting member and oriented for engagement with said magnetic surface;

a follower engageable with said grooved track and fixed to said mounting member a predetermined distance from said magnetic head assembly;

means for resiliently urging said magnetic head assembly into engagement with said magnetic surface and said follower into engagement with said grooved track, said means being coupled with said mounting member at a position selected intermediate said magnetic head assembly and said follower the moment of said follower means being smaller than the moment of said magnetic head assembly; and means for rotating said magnetic head assembly and said follower about said given axis so as to permit said recording and playback head to trace a recording upon said magnetic surface having a locus corresponding to said cyclical track.

9. The magnetic sound recording and reproducing apparatus of claim 8 wherein said follower is selected having an inertial mass substantially lower than said magnetic head assembly, whereby said magnetic head assembly will tend to pivot away from said magnetic surface about the position of engagement of said follower with said groove in the presence of sufficient inertial change.

10. The magnetic sound recording and reproducing apparatus of claim 9 in which:

said follower means is present as a follower pin movable engageable with said grooved tract; and said mounting member is formed as a unitary structure supporting said follower pin and said magnetic head assembly.

* * * * *